J. N. & T. WALLIS.
Axle and Box.
No. 65,622.    Patented June 11, 1867.
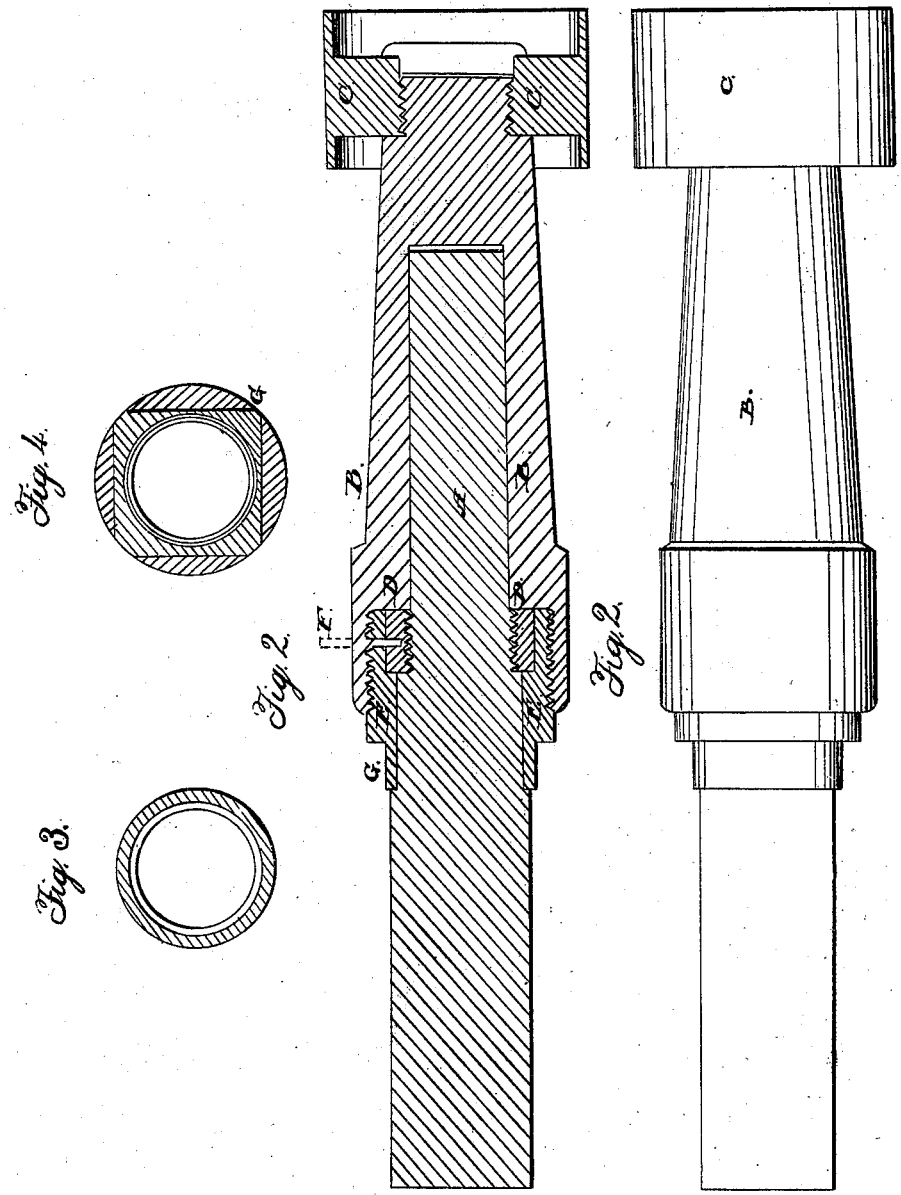

United States Patent Office.

JOHN N. WALLIS AND THEODORE WALLIS, OF FLEMING, NEW YORK.

Letters Patent No. 65,622, dated June 11, 1867.

IMPROVEMENT IN WAGON-AXLE AND BOX.

The Schedule referred to in these Letters Patent and making part of the same.

TO WHOM IT MAY CONCERN:

Be it known that we, JOHN N. and THEODORE WALLIS, of the town of Fleming, in Cayuga county, New York, have invented a new and improved mode of Constructing Wagon-Axles and Boxes therefor; and we do hereby declare the following to be a full, clear, and exact description of the same, reference being had to the accompanying drawings, making a part of this specification, and to the letters of reference marked thereon.

In constructing wagon-axles it is customary to weld on or upset a collar on the end of the arm of the axle nearest the wagon, for the purpose of preventing the wheels from coming off the axle when once placed thereon. Now, whenever the two arms of the axles are to be welded together in the middle, two rings or thimbles of some sort require to be slipped on to the axle-shaft inside the said collar, and of such construction that they may be screwed into or in some way attached to the hub of the wagon-wheel, which, when placed on to the arm of the axle, acts against the collar on the outside, while the ring or thimbles placed inside the collar, when the two portions of the axles are welded together, are slipped out against said collar, and fastened to the end of the hub of the wheels. Thus the wheel is held in its proper place by means of the collar, as the hub is on one side and the collar on the other, and both being fastened together the wheel cannot be separated from the axle until first separated from the ring or thimble inside the collar. Now the object of this invention is to construct the collar and axle in such manner that the ring or thimble which has to be put on at the time of welding the two portions of the axles together may be removed and replaced without cutting the axle for this purpose by attaching the collar to the axle with a screw. The second part of our invention relates to the method employed to hold the box firmly in the wagon-hub.

In order that others may know how to make and use our invention, we will proceed to describe its construction and mode of operation.

Figure 1 is a plan of the axle, box, and sand-band, showing the several parts as they appear when all are put together when in use.

Figure 2 is a longitudinal section of the same, showing in what manner the several parts are constructed and held together.

Figure 3 is an end view of the collar.

Figure 4 is an end view of the ring or thimble.

A is the arm of the axle, and B is the box fitted into the hub of the wagon-wheel, and extends through said hub a distance sufficient to allow of screwing on to the end of the same the sand-band C. The object of screwing on this band is to prevent the box B from becoming loose in the hub. The collar D is secured to the axle as represented at D D. When the collar is to be put on to the axle, it is first slipped into the thimble E, as represented in the drawing, and then both are slipped over the arm of the axle to the threaded portion thereof, and a small pin, F, inserted into a hole in the thimble and collar, the holes in each coming opposite each other, and by turning the thimble E the collar D will be screwed on to its proper place, when the pin F is removed, and this allows the thimble E to turn freely on the axle. Now when the wheel is to be put on to the axle a wrench or key is placed on to the square portion of the thimble E at G, and by holding the nut firm, the box B being in the hub of the wheel may be turned on to the threaded portion of the thimble, which holds all the parts firmly in their proper place. The wheel may be removed with the same ease as it is placed on the axle, and the collar as well, by reversing the operation above described.

Having minutely described above the mode of constructing and operating our invention, what we claim as new, and wish to secure by Letters Patent, is—

1. The collar D, in combination with the thimble E and box B, when all are constructed, arranged, and operated substantially in the manner and used for the purpose specified.

2. Securing the sand-band C to the box B, as and for the purpose specified.

JOHN N. WALLIS,
THEODORE WALLIS.

Witnesses:
AVERY BABBETT,
H. M. BABBETT.